Patented Mar. 14, 1950

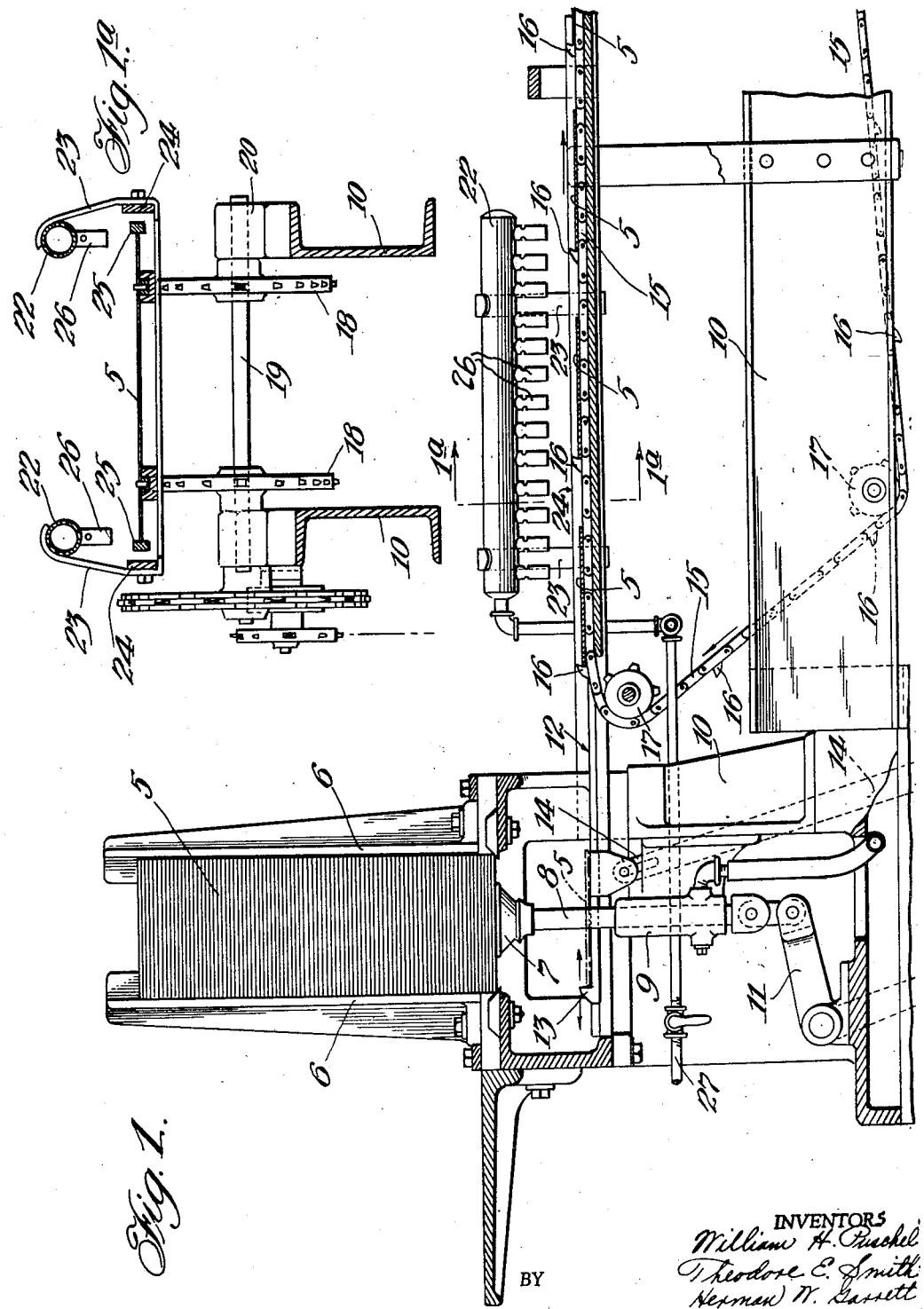

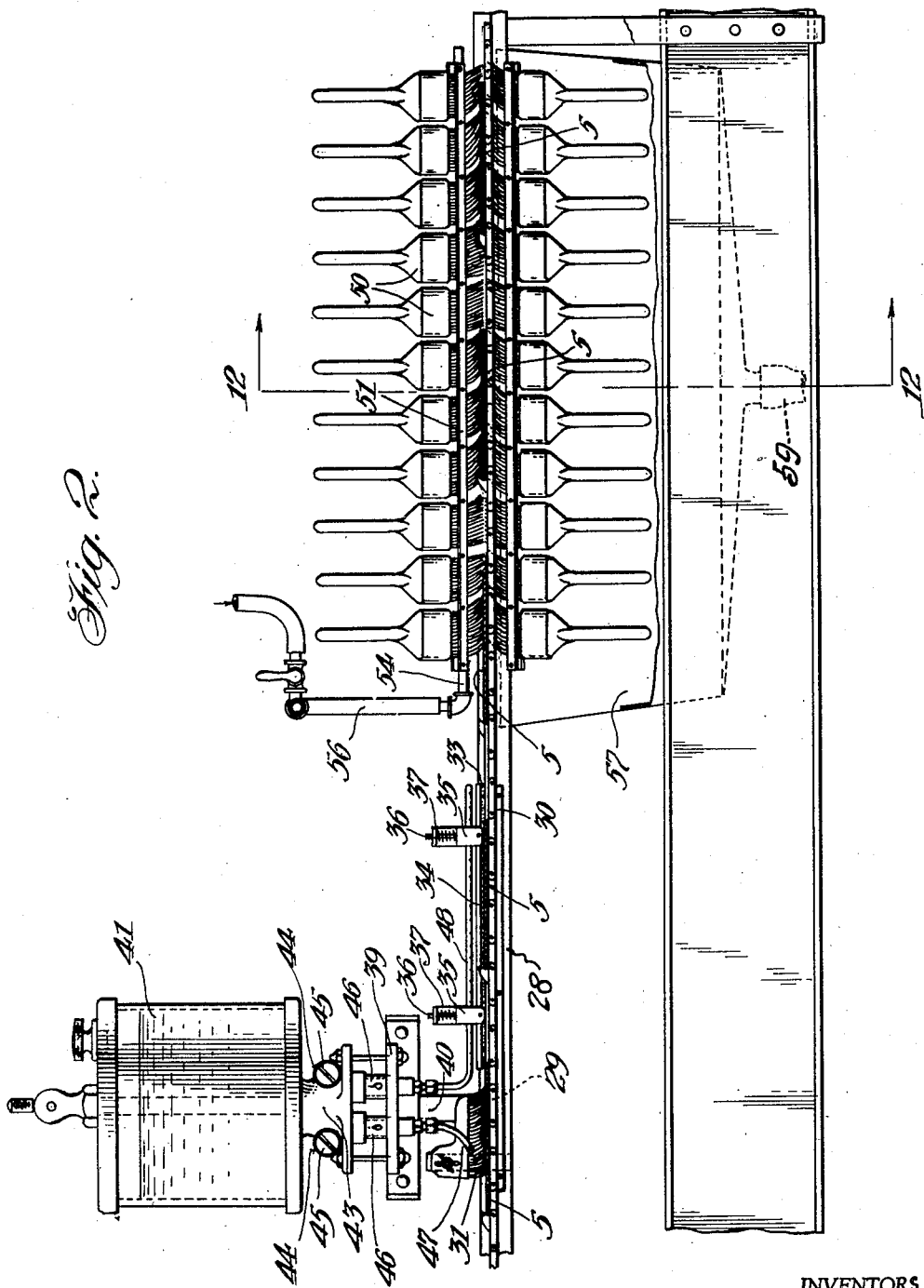

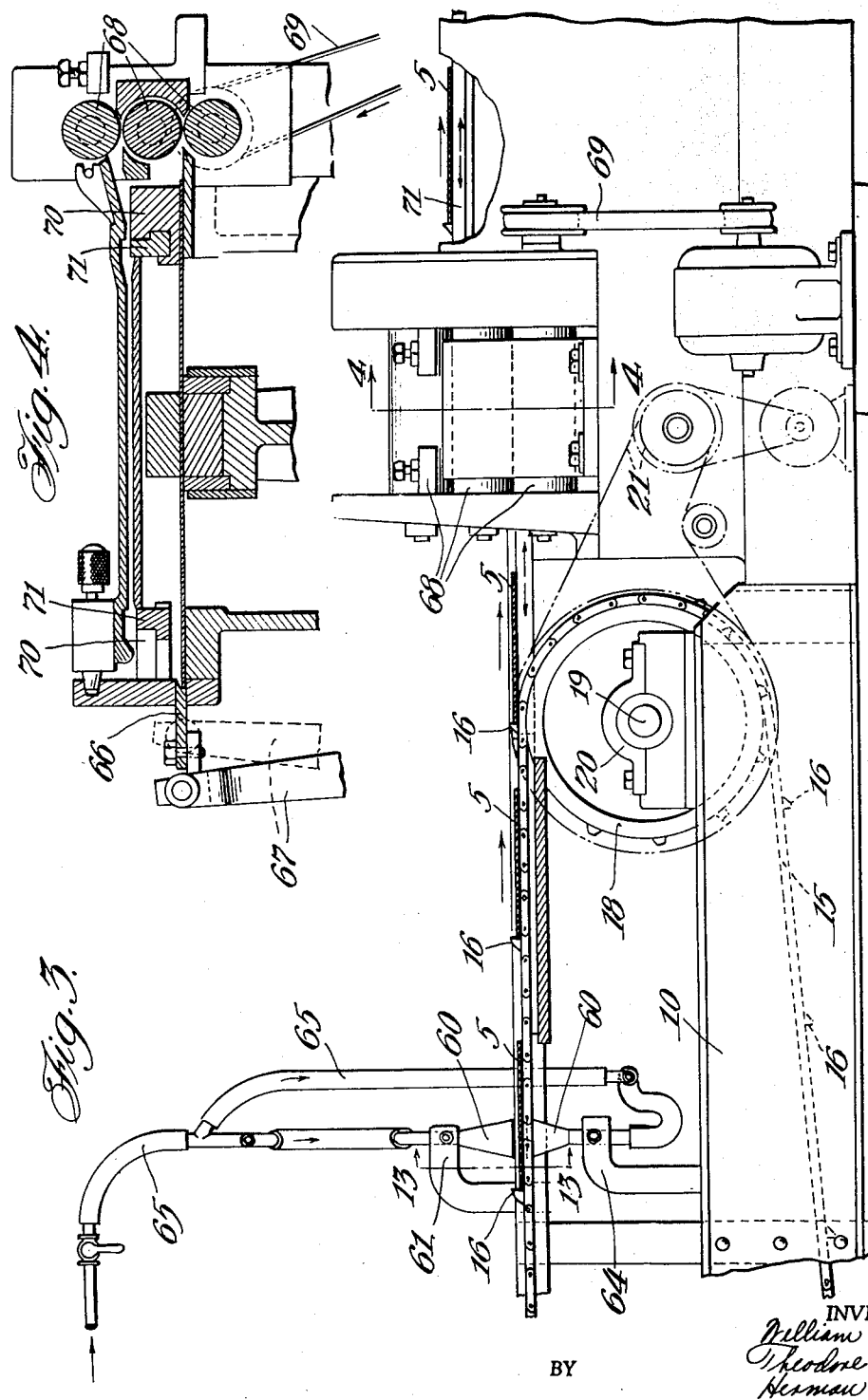

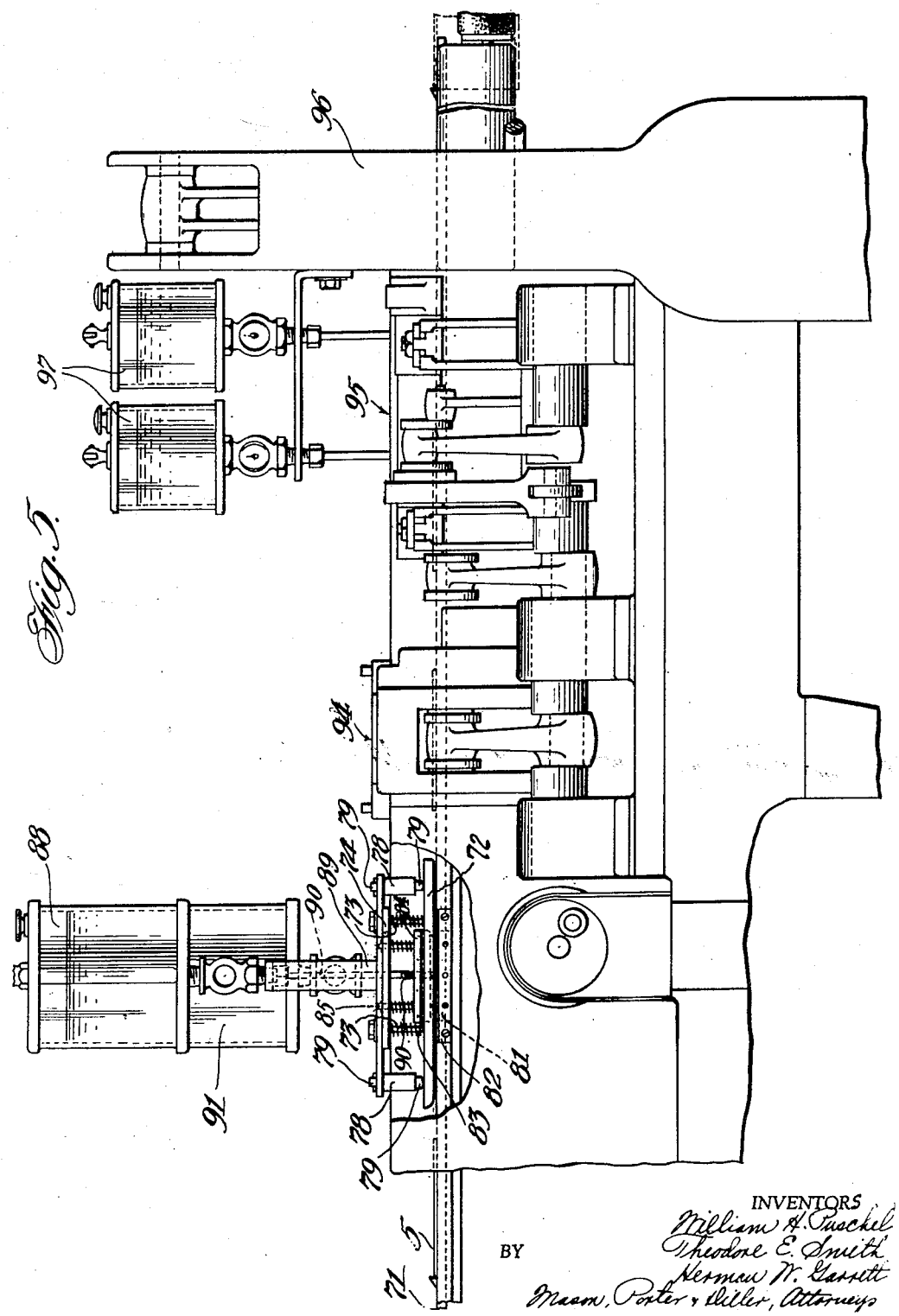

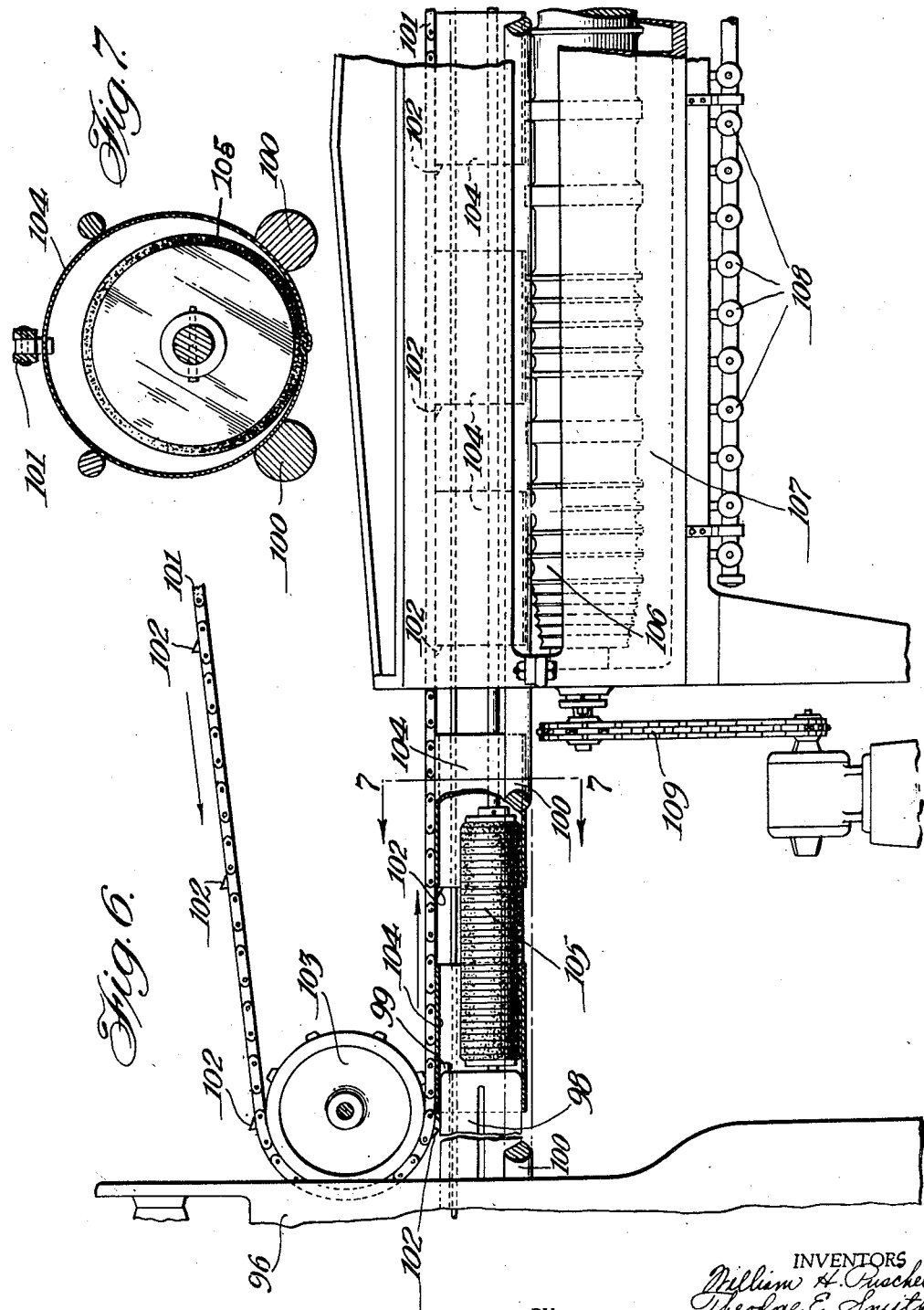

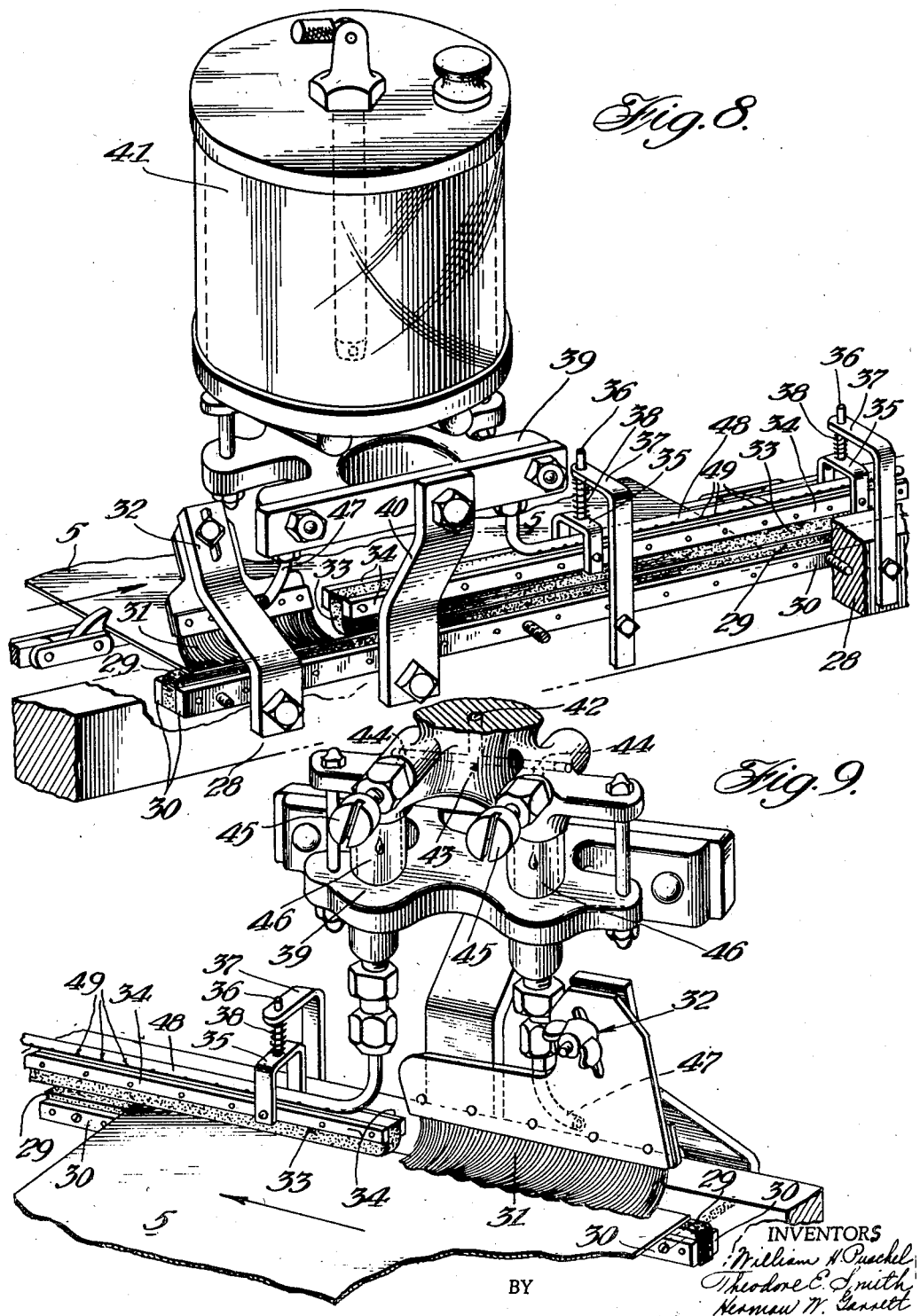

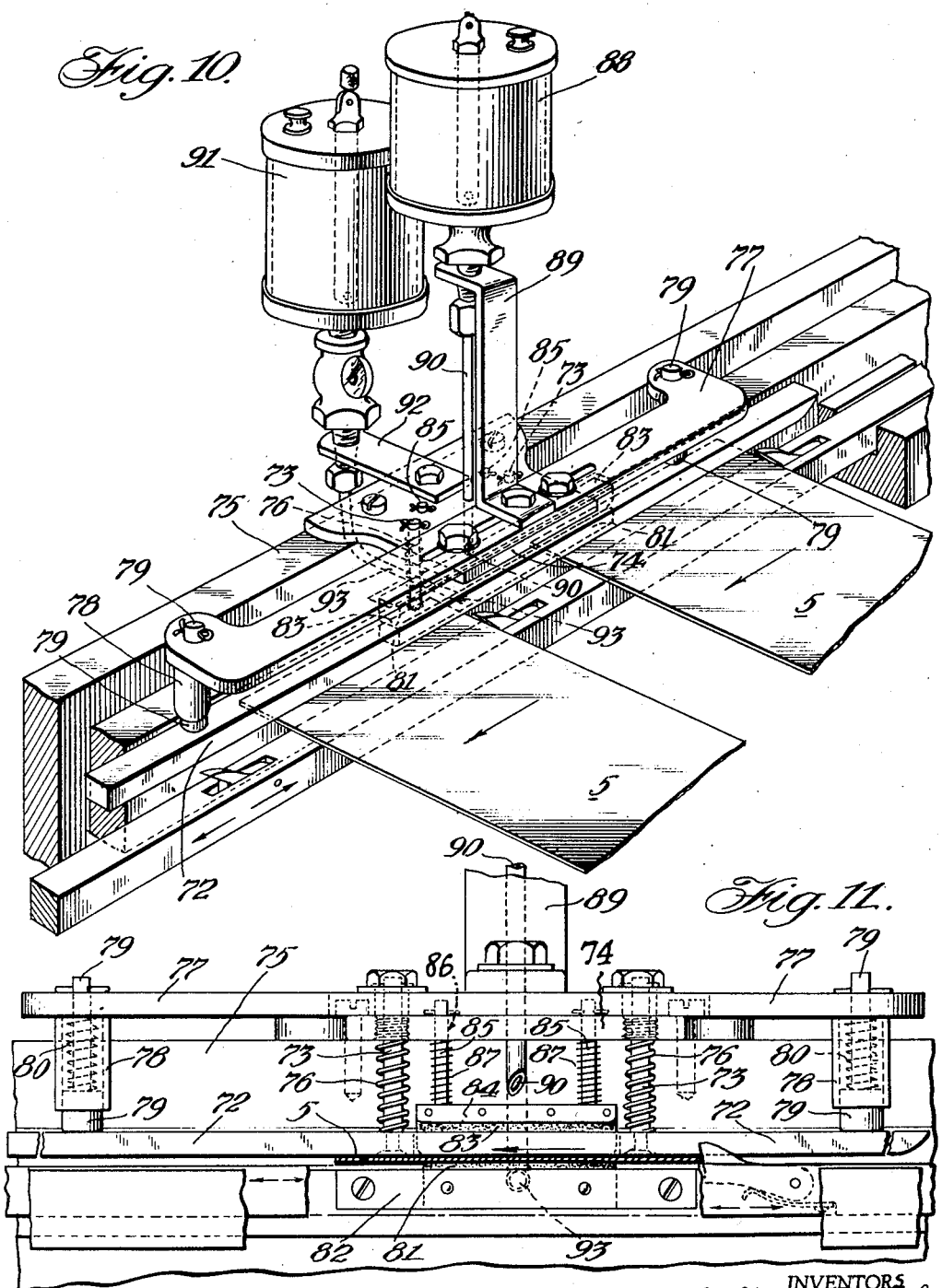

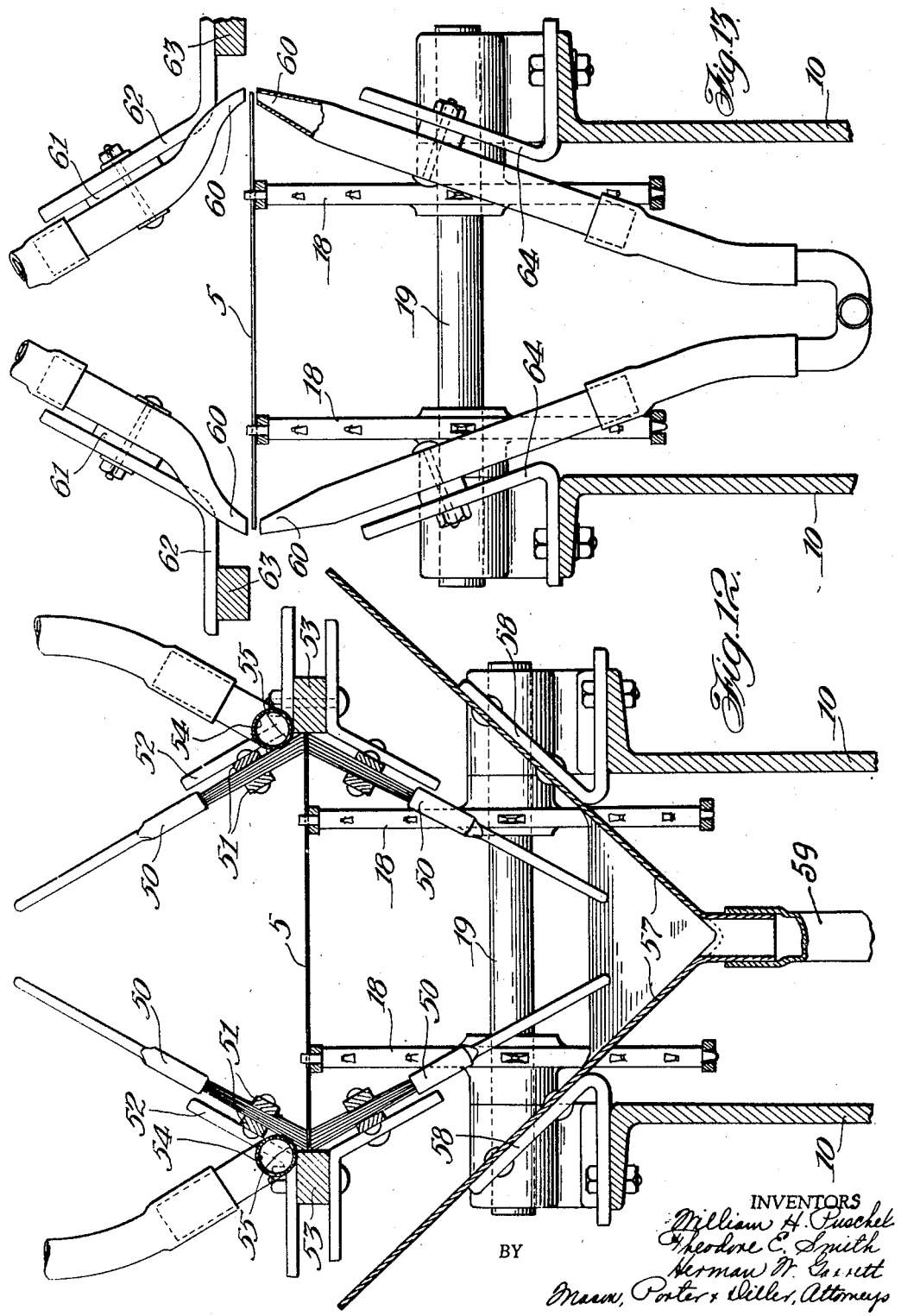

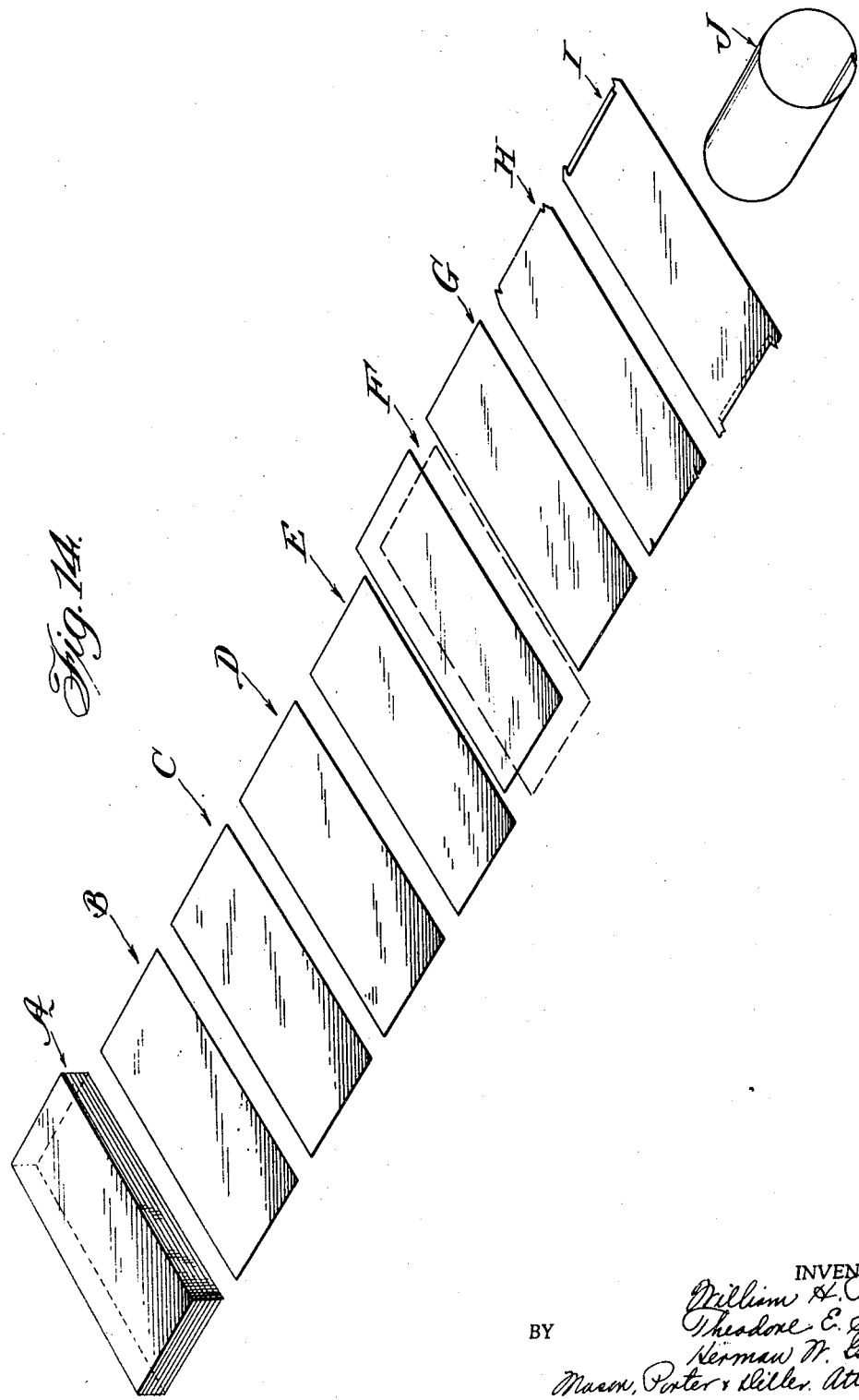

2,500,568

UNITED STATES PATENT OFFICE 2,500,568

SWAB APPARATUS FOR APPLYING ACID TO CAN BODY BLANKS

William H. Puschel, Chicago, Ill., and Theodore E. Smith and Herman W. Garrett, Elwood, Ind., assignors to Continental Can Company, Inc., New York, N. Y., a corporation of New York Application August 5, 1942, Serial No. 453,708

3 Claims. (Cl. 15—102)

1

The invention relates generally to the art of manufacturing metallic receptacles and primarily seeks to provide a novel swab apparatus for applying acid to can body blanks.

It has been found difficult and commercially impractical heretofore to make can bodies including solder bonded side seams from black plate blanks. Perhaps the principal difficulty has been experienced because of the inability efficiently to solder black plate. It is well known that in order to solder black plate, the portions thereof to be soldered must be cleansed of oxidation and scale, for without such cleansing the solder will not properly adhere to the metal. Moreover, the soldering must be performed immediately after the surface cleansing because reoxidation takes place rapidly. Various methods have been tried in efforts to solve this problem, among them being that of applying protective coatings to previously cleansed portions of the plate, said coatings having the quality of facilitating, or at least not interfering with efficient soldering, and being intended to protect the cleansed surfaces against oxidation and scale accumulation prior to soldering. Such methods have partially solved the problem in that they permit storing of the treated plate before soldering, but obviously such procedure is not entirely satisfactory because of the labor and expense involved in this special treatment which could be eliminated in a practical continuous process in which the cleansing of the plate and the formation of the can bodies and solder bonding of the side seams thereof is carried out without intervention of any protective coating and storing of the blanks. It is a purpose of this invention to provide novel apparatus of the character stated.

Another object of the invention is to provide novel apparatus of the character stated in which the means for applying the cleansing acid includes upper and lower blank edge contacting pads between which the blanks are fed, and means for continuously supplying acid to said pads.

With the above and other objects in view that will hereinafter appear, the nature of the invention will be more fully understood by following the detailed description, the appended claims and the several views illustrated in the accompanying drawings.

In the drawings:

Figure 1 is a fragmentary vertical longitudinal section of a body maker embodying the invention, the section being taken through the body

2 blank stack or the supply station, and through the preheating station.

Figure 1a is a vertical cross section taken on the line 1a—1a on Figure 1.

Figure 2 is a view similar to Figure 1, the section being taken through the first cleansing or acid applying station, and through the washing station.

Figure 3 is a fragmentary part vertical longitudinal section and part right side elevation of the body maker, the drying station and the blank curling or grain breaking station being shown.

Figure 4 is a fragmentary vertical cross section taken on the line 4—4 on Figure 3.

Figure 5 is a fragmentary side elevation of the machine illustrating the second acid applying station, the slitting and notching station, the fluxing station, the hook forming station and the body shaping or forming station, parts being broken away to better illustrate the applicators at the acid applying station.

Figure 6 is a fragmentary side elevation and part vertical longitudinal section of the machine at the position of the surplus flux removing station and the solder bonding station.

Figure 7 is a vertical cross section taken on the line 7—7 on Figure 6.

Figure 8 is a detail outside perspective view illustrating the acid applicators at the first acid treating station.

Figure 9 is an inside perspective view illustrating the parts shown in Figure 8.

Figure 10 is an inside perspective view illustrating the acid applicators at the second acid treating station.

Figure 11 is a vertical longitudinal section illustrating the mounting of the applicators shown in Figure 10.

Figure 12 is an enlarged vertical cross sectional view taken on the line 12—12 on Figure 2.

Figure 13 is an enlarged vertical cross sectional view taken on the line 13—13 on Figure 3.

Figure 14 is a diagrammatic perspective view illustrating the sequence of treatment of the blanks at the various stations from the supply station through the body forming station.

The novel apparatus is intended for use in the practicing of a can body making method which is diagrammatically illustrated as performed in a body maker of the Troyer-Fox type, well known in the art and illustrated in the U. S. Letters Patent to Troyer 1,772,820 of August 12, 1930. From that patent disclosure it will be apparent that in machines of this type body blanks are drawn one by one from a supply stack at the supply station and are then fed step by step through an idle station, a grain breaking station at which the blanks are fed laterally off the feed line, are curled so as to break the grain and facilitate subsequent shaping of the can bodies and then returned to the feed line in which they are then advanced step by step through an idle station, a slitting and notching station, then through two folding stations at which hooks are formed at the lateral edges of the blanks in successive stages and intended to subsequently engage in the formation of side seams, and then another idle station to the shaping or forming station at which the can bodies are formed. The formed can bodies then pass on to the solder bonding station at which the side seams are solder bonded.

In Figure 9 of the Troyer Patent, 1,772,820 the sequence of operations in advance of the solder bonding of the can bodies is diagrammatically illustrated, and in order to facilitate understanding of the method in which the invention apparatus is employed a similar diagrammatic illustration is made in Figure 14 herein. In this figure the first step of the method or the feeding of the blanks from the supply is indicated at A. According to the method the blanks next have the lateral edge portions thereof which are to be ultimately formed into solder bonded side seams preheated at station B. The blank edge portions are next cleansed of oxidation and scale by an acid treatment at station C, after which they are thoroughly washed to remove the treating acid at station D and air dried at station E. The curling or grain breaking step is performed at station F, and this step is immediately followed by a second acid cleansing treatment at station G. This second cleansing treatment is followed by the successive edge slitting and notching and hook forming steps diagrammatically indicated at station H and I. It is to be understood that the lateral edge portions of the blanks also are given a flux treatment following the cleansing treatment at station G, and after the completion of the hooks on the blanks the blanks are shaped into bodies at station J. It is to be understood that following the shaping of the bodies at the end of the succession of treatments and operations diagrammatically indicated in Figure 14, the formed can bodies pass immediately to the solder bonding station so that the solder bonding is performed promptly after said treatments and without any possibility of oxidation or scale interfering with the efficient solder bonding of the side seams. It has been found that by practicing the method steps hereinabove briefly outlined, and by employing apparatus of the nature hereinafter described in the performance of these method steps, can bodies can be formed of black plate and efficiently solder bonded at the rate of at least 250 cans per minute.

In the cleansing treatment herein referred to the cleaning acid may be a citric acid solution and the following formula has been found practical: a solution composed of granulated citric acid and distilled water in the proportions of two (2) pounds of granulated citric acid dissolved in 48 ounces of distilled water.

In the fluxing step herein disclosed it has been found practical to employ a flux solution of salts, alcohol and glycerine in the proportions of 4½ pounds of salts composed of 80 percent zinc chloride and 20 percent ammonium chloride and dissolved in two (2) gallons of alcohol with one (1) quart of glycerine added thereto.

In describing the apparatus herein illustrated as an example of embodiment of the invention, attention is first directed to Figures 1 and 1a of the drawings in which the supply and preheating stations are illustrated.

At the supply station blanks 5 are supported in a supply stack 6 and blanks are withdrawn one by one from the bottom of the stack by a suction cup 7 carried at the upper end of a plunger 8 which is vertically reciprocable in a bearing 9 supported on the machine framing 10. The plunger 8 is vertically reciprocated through the medium of an actuator member 11 to which movement is imparted from any suitable power source on the machine (not shown).

The individually withdrawn body blanks are fed along supporting ways 12 by the reciprocating feeder 13 to which movement is imparted by an actuator arm driven in any approved manner from a power source on the machine (not shown). The individual body blanks are thus fed toward the preheating station indicated at B in Figure 14, and at or just in advance of this station the feeding of the blanks is taken over by a pair of continuously traveling chains 15 which are equipped with equidistantly spaced feeder fingers 16 and passing over idler sprockets 17 and over a driver sprocket 18. See Figures 1 and 3. The driver sprocket 18 is mounted on a shaft having bearing as at 19 on the machine framing 10, and which may in turn be driven by sprocket and chain connections 21 from a suitable driving means. See Figure 3.

At the preheating station a manifold 22 is supported as at 23 upon frame rails 24 at each side of the feedway and directly over the lateral edge portions of the traveling blanks. See Figures 1 and 1a. The lateral edges of the continuously traveling blanks, guided by the guide rails 25 pass directly beneath the jet burners 26 which depend from the manifolds 22 and are thus preheated by the flames emitted from the burners, gas being supplied to the manifolds 22 through suitable valve control pipe lines 27.

The blanks next pass to the cleansing station, the position of which is diagrammatically indicated at C in Figure 14. In describing the parts of the apparatus located at this station, attention is directed to Figures 2, 8, and 9 of the drawings. At this station the lateral edges of the blanks 5 are guided by side rail portions 28 and pass over bottom applicators in the form of a pair of elongated swab strips 29 formed of absorbent material such as felt. One such strip is provided at each side of the body blank feedway, and each strip is secured between bars 30 which may in turn be secured to the side rail portions 28. The upper portion of the strip is exposed above the bars 30.

The advance portion of each strip 29 is disposed beneath the applicator brush 31 which is vertically-adjustably mounted as at 32, at an angle of approximately 45 degrees, on the respective side rail portion 28. The remainder of each bottom strip 29, or that portion thereof which follows the respective brush 31, is opposed by an upper swab strip 33 which is secured between bars 34 in the manner clearly illustrated in Figures 8 and 9 of the drawings. Each upper strip equipment 33, 34 is supported in a plurality of U brackets 35, each such bracket having a plunger 36 projecting upwardly therefrom through an aperture in a bracket 37 attached to the respective rail portion 28, and a compression spring 38 surrounds each plunger beneath the respective bracket and serves to yieldably urge the connected swab strip toward the underlying swab strip.

A supporting bracket 39 is associated with each upper and lower swab strip and brush complement and is mounted as at 40 in the respective rail portion 28. Each bracket 39 supports an acid supply reservoir 41, and acid is supplied from each reservoir through a central supply duct 42, a manifold duct 43, and two individual supply ducts 44 to the brush and upper strip equipments. Each duct 44 is valve controlled as at 45, and the acid delivered therethrough under control of said valve equipments drips through sight glasses 46, the controlled dripping of acid from one duct passing through a distributor tube 47 onto the inclined brush 31, and the drip from the other duct being supplied to the upper swab strip 33 through the medium of the long supply pipe 48 which overlies said strip and is perforated as at 49 so as to deposit the acid onto said strip. It should be understood that acid is supplied to the bottom swab strip 29 by contact of the brush 31 and the upper swab strip 33 therewith through the spaces intervening the successively, continuously fed blanks 5. It should be understood that in passing through the cleansing station C the blanks 5 have all oxidation and scale removed from the upper and lower edge portions thereof which are subsequently to be formed into the can body side seams in the manner well understood in the art.

After having their edge portions acid treated or cleansed in the manner above described, the blanks 5 pass immediately to the washing station D at which all of the treating acid is removed from the lateral edge portions thereof. In describing this step in the method and the apparatus employed in its performance, attention is directed to Figures 2 and 12 of the drawings.

At the washing station D the blanks pass between upper and lower sets of brushes 50. Each upper and lower set of brushes is disposed in angular relation to the traveling body blanks which they engage, the upper sets of brushes being inclined upwardly and inwardly toward each other, and the lower sets of brushes being inclined downwardly and toward each other in the manner clearly illustrated in Figure 12. Each upper and lower set of brushes is gripped and rigidly supported in the position stated between bars 51 which are secured as at 52 to the blank edge guiding rail portions 53 provided at that particular station. Water is supplied to each upper set of brushes through a manifold 54 which extends over all of the brushes of the set in the manner indicated in Figure 2. Each manifold pipe is perforated as at 55 so as to deposit water onto the brushes and is supplied with water through a suitable valve controlled supply line 56. It will be obvious that by thus supplying water to the upper sets of brushes, the lower sets of brushes also will be supplied by contact with the upper brushes in the spaces intervening the blanks traveling continuously in spaced relation. The water applied by the brushes serves to thoroughly wash the body blanks free of all cleansing acid, oxide and scale, and the surplus of washing fluid is collected in a trough 57 supported at 58 beneath the washing station and passes off through the drain 59.

After being thus washed, the blanks are next fed to the drying station indicated at E in Figure 14. The drying equipment disposed at this station is best illustrated in Figures 3 and 13 of the drawings. This equipment comprises upper and lower air blast nozzles 60 disposed to direct air blasts against the upper and lower sides of the blanks at each lateral edge thereof. The nozzles are disposed in angular relation to the blanks, the upper pair of nozzles being inclined upwardly and inwardly, and the lower nozzles being inclined downwardly and inwardly. Each upper nozzle is secured to a bracket arm 61 which is in turn secured as at 62 to the adjacent side rail portion 63, and each lower nozzle is secured through the medium of a bracket 64 to the adjacent portion of the machine framing 10. Compressed air is supplied to the nozzles 60 through suitable valve controlled pipe line equipment 65 and the air blasts directed through these nozzles against the upper and lower edge surface portions of the blanks serves to thoroughly dry the same and complete the initial cleansing thereof of all oxidation and scale which would otherwise render impossible efficient solder bonding of the side seams.

The blanks next pass on to the curling or grain breaking station indicated at F in Figure 14, this station being best illustrated in Figures 3 and 4 of the drawings. The chains 15 deliver the blanks 5 at the grain breaking station, but their feeding function terminates at this point in the manner clearly illustrated in Figure 3, the remainder of the feeding of the body blanks being accomplished by reciprocating feed bars in the manner well known in the art of body making.

At the grain breaking station the blanks are moved laterally by a reciprocating pusher 66 operated by an actuator arm 67 driven in any approved manner by machine drive parts (not shown), and in being fed laterally the blanks are caused to engage the curling rolls 68. These rolls remove the blanks from the lower level feedway, curl them in a manner for breaking the grain in the metal and facilitating the subsequent shaping of the can bodies and return them to the higher level feedways indicated at 70 in Figure 4 and over which the blanks are fed intermittently, or station by station, by the conventional reciprocating feed bars 71.

The blanks next pass to the second acid treating station indicated at G in Figure 14. The apparatus provided at this station is best illustrated in Figures 5, 10, and 11 of the drawings. In moving through this station the blanks pass under presser bars 72, one thereof being disposed at each side of the feedway. Each bar is supported intermediately of its ends on two plungers 73 which are vertically movable through apertures in a bracket 74 supported in spaced relation above the traveling can body blanks, each said bracket being secured to and extending inwardly from the adjacent frame portion 75. A compression spring 76 surrounds each plunger 73 between the upper surface of the respective bar 72 and the under surface of the respective bracket 74 so as to constantly urge the respective bar 72 downwardly.

A support bar 77 overlies and is secured to the inwardly extended upper surface of each bracket 74, and each bar 77 is equipped at its ends with depending bosses 78 in which are mounted plungers 79 which engage end portions of the presser bar 72 and pass upwardly through apertures in the bar 77. Compression springs surround the plungers within the bosses 78 and yieldably urge the plungers downwardly in contact with the bar 72.

Between terminal limits of the presser bar 72 the can body blanks are fed over a swab strip 81 disposed at each side of the feedway in position for engaging the under surface of the blanks at the respective edge extremity thereof. Each swab strip is secured as at 82 to the adjacent frame portion 75 and is opposed by an upper swab strip 83 which is secured to a carrier 84. Each carrier has a pair of plungers 85 extended upwardly therefrom through apertures 86 in the inward extension of the bracket 74, compression springs 87 being interposed between the carriers and the brackets so as to yieldably press the upper swab strips 83 against the lower swab strips.

Two reservoirs are provided for supplying treating acid to the upper and lower swab strips at each side of the feedway. One of the reservoirs 88 is supported as at 89 on the support bar 77 and feeds acid to the upper swab strip through the delivery duct 90. The other reservoir 91 of each side complement is supported as at 92 on the bracket 75 and feeds its treating acid to the respective lower strip through a delivery duct 93.

The second acid treating station G is followed by the slitting and notching station, generally designated 94 in the apparatus disclosure of Figure 5, the hook forming station generally designated 95, and the body shaping or forming station generally designated 96. While moving to the body forming station 96 the can body blanks have their lateral edge portions fluxed in order to facilitate the subsequent solder bonding of the side seams in which these edge portions engage in the conventional manner. This fluxing may be accomplished by any approved apparatus, as by applicators of the nature illustrated in Figures 10 and 11, or by any other acceptable form of flux applying means. If flux applicators of the nature illustrated in Figures 10 and 11 are employed they may be supplied by reservoirs 97 disposed as indicated in Figure 5 of the drawings.

The shaped or formed bodies are fed from the station generally designated 96 at which they are formed by the usual reciprocating feeder means 99, into an outside horn or horse 100 best illustrated in Figures 6 and 7 of the drawings and through which they are fed through the solder bonding station. At the entrance to the outside horn 100 the feeding of the formed can bodies is taken over by the usual endless chain 101 equipped with feeder fingers 102 and passing over the idler sprocket 103. This chain is driven in the conventional manner by means not shown.

As the formed can bodies 104 leave the horn 98, the interiors thereof at the position of the side seams are contacted by a yieldably surfaced swab roll 105 which serves to remove any surplus of flux from the interiors of the can bodies at the side seams. The can bodies then immediately engage the solder roll 106 which rotates in the solder bath 107 maintained in molten condition by the heat applying means 108, the roll being driven in any suitable manner, as by the motor and sprocket and chain drive generally designated 109.

It is to be understood that the apparatus herein disclosed is but an acceptable embodiment of the invention and may be variously modified without departing from the spirit and scope of the invention as defined in the appended claims.

We claim:

1. In apparatus of the character described, can body blank supporting ways, means for continuously feeding body blanks along said ways in spaced relation, and means for pressure swabbing lateral upper and lower edge portions of said blanks, said last named means comprising upper and lower swab strips disposed in opposing relation and between which lateral edge portions of the fed blanks engage in drag contact as they move over the supporting ways, means for feeding acid to each of the strips, the lower one of said strips being stationarily supported, means yieldably urging the upper strip against the lower strip, a presser bar engageable with the blanks in parallel relation to and close to said strips, and means yieldably pressing said bar against the traveling blanks, said bar being of a length for extending a distance at each end beyond said strips.

2. In apparatus of the character described, can body blank supporting ways, means for continuously feeding body blanks along said ways in spaced relation, and means for pressure swabbing lateral upper and lower edge portions of said blanks, said last named means comprising upper and lower swap strips disposed in opposing relation and between which lateral edge portions of the fed blanks engage in drag contact as they move over the supporting ways, the lower one of said strips extending a distance in advance of the upper strip so as to be contacted by the blanks before they contact the upper strip, a separate applicator brush overlying and contacting the extended portion of the lower strip and effective to engage in drag contact with blanks fed thereunder, means for directing acid onto said separate applicator, and means for directing acid onto said upper strip, said upper strip and said applicator serving to apply acid to the lower strip by contact therewith between travelling blanks.

3. In apparatus of the character described, can body blank supporting ways, means for continuously feeding body blanks along said ways in spaced relation, and means for pressure swabbing lateral upper and lower edge portions of said blanks, said last named means comprising upper and lower swab strips disposed in opposing relation and between which lateral edge portions of the fed blanks engage in drag contact as they move over the supporting ways, the lower one of said strips extending a distance in advance of the upper strip so as to be contacted by the blanks before they contact the upper strip, a brush overlying and contacting the extended portion of the lower strip and effective to engage in drag contact with blanks fed thereunder, means for directing acid onto said brush, and means including a manifold tube extending in parallel relation over said upper strip and having orifices therein for directing acid onto said upper strip, said upper strip and said applicator serving to apply acid to the lower strip by contact therewith between travelling blanks.

WILLIAM H. PUSCHEL.
THEODORE E. SMITH.
HERMAN W. GARRETT.

REFERENCES CITED

The following references are of record in the file of this patent:

UNITED STATES PATENTS

| Number | Name | Date |
|---|---|---|
| 393,082 | Sleeper | Nov. 20, 1888 |
| 451,261 | Buckman | Apr. 28, 1891 |

UNITED STATES PATENTS

| Number | Name | Date |
|---|---|---|
| 489,969 | Livingston | Jan. 17, 1893 |
| 547,086 | Norton | Oct. 1, 1895 |
| 805,833 | Ayars | Nov. 28, 1905 |
| 888,202 | Strickler | May 19, 1908 |
| 935,229 | Phelps | Sept. 28, 1909 |
| 995,589 | Eichmann | June 20, 1911 |
| 1,123,081 | Bowser | Dec. 29, 1914 |
| 1,334,092 | Harmeling | Mar. 16, 1920 |
| 1,371,221 | Burke | Mar. 15, 1921 |
| 1,542,451 | Hay | June 16, 1925 |
| 1,902,815 | Goodhue | Mar. 28, 1933 |
| 1,918,662 | Phelps | July 18, 1933 |
| 1,934,357 | Kronquest | Nov. 7, 1933 |
| 2,055,934 | Kronquest | Sept. 29, 1936 |
| 2,225,778 | Hallman | Dec. 24, 1940 |
| 2,326,814 | Wobbe | Aug. 17, 1943 |

FOREIGN PATENTS

| Number | Country | Date |
|---|---|---|
| 2,411 | Great Britain | A. D. 1874 |